Inventor
Lorron L. Warriner

Dec. 4, 1951  L. L. WARRINER  2,577,389
GAS GENERATING APPARATUS
Filed July 14, 1947  2 SHEETS—SHEET 2
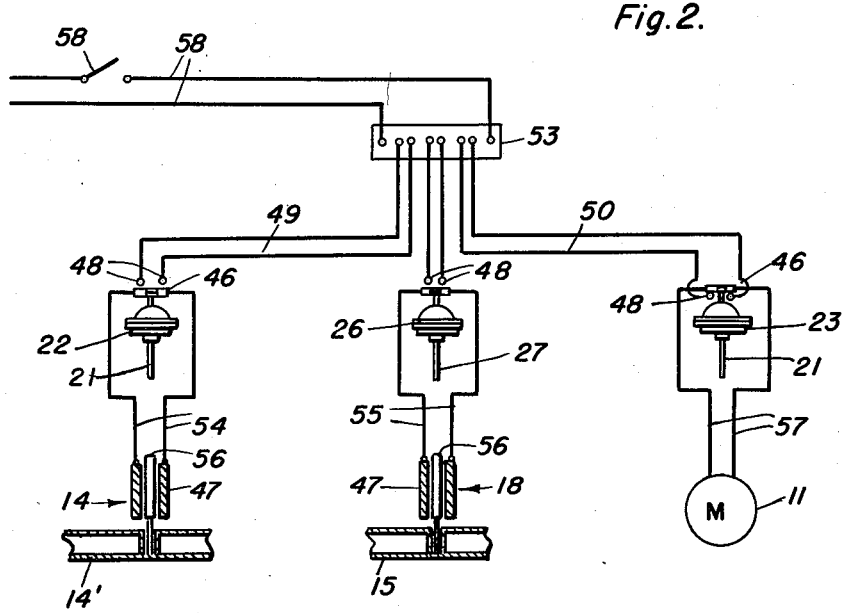
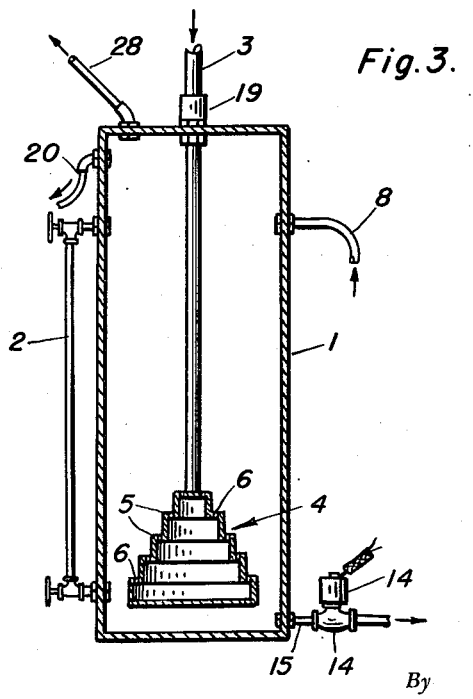
Inventor
Lorron L. Warriner
By Clarence A. O'Brien
and Harvey B. Jacobson
Attorneys Patented Dec. 4, 1951

2,577,389

UNITED STATES PATENT OFFICE 2,577,389

GAS GENERATING APPARATUS

Lorron L. Warriner, Miami, Fla., assignor, by mesne assignments, to Vapo-Gas Consolidated, Inc., a corporation of Florida Application July 14, 1947, Serial No. 760,736

4 Claims. (Cl. 261—26)

My invention relates to improvements in apparatus for and methods of producing gaseous fuel mixtures from air and volatile liquid hydrocarbons, especially gasoline and benzol, also alcohol.

In producing such mixtures by present-day practices, for instance, by bubbling air through liquid hydrocarbons to obtain a gaseous mixture suitable for fuel, or other purposes, the mixture obtained is frequently unstable, that is, it varies from a rich mixture to a lean one unsuitable for fuel purposes. Also, a heavy residue of liquid is left over which is not suitable for any purpose, constitutes waste, and presents a disposal problem.

With the foregoing in mind, the primary object of my invention is to provide for inexpensively producing such a gaseous mixture of unvarying proportions and constant value for fuel purposes, particularly in internal combustion engines, and without waste of such liquid, or residue.

Another object is to provide apparatus for the purpose above set forth particularly adapted for installation at filling stations, and like places where such liquid hydrocarbons are stored in quantity underground, and where an air compressor is available, the apparatus being automatically operative to produce such a mixture when connected to such storage sources and compressed air supplying devices.

Other and subordinate objects, also comprehended by my invention, together with the precise nature of my improvements, will be readily understood when the succeeding description and claims are read with reference to the drawings accompanying and forming part of this specification.

In said drawings:

Figure 2 is a diagrammatic view illustrating the solenoid valves and the pressure controlled electric switches with the wiring therefor; and Figure 3 is a view in vertical section of the generating, or carbureting, tank drawn to a larger scale.

Figure 1:
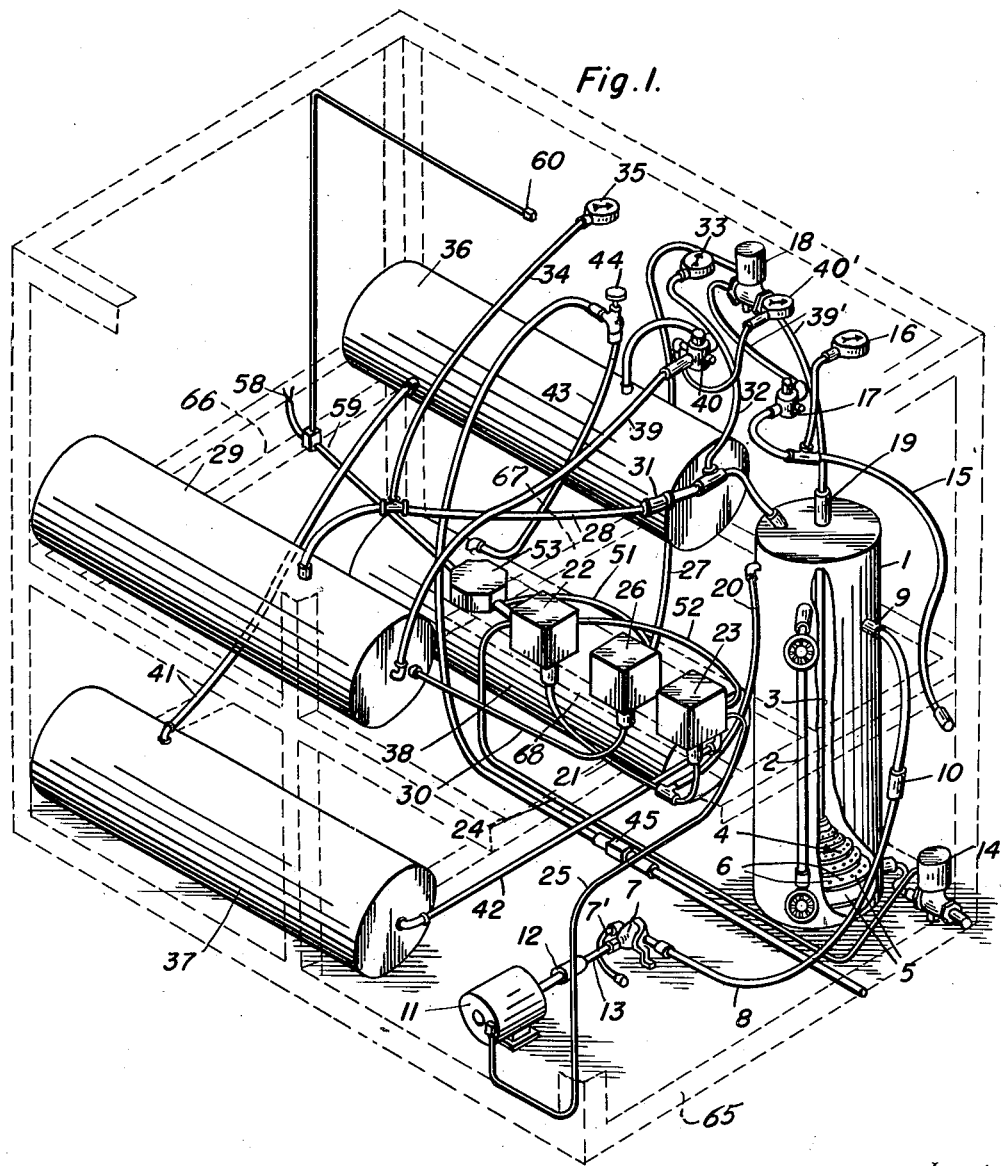
Figure 1 is a view in perspective of a preferred form of apparatus for practicing my improved method.

Referring to the drawings by numerals, according to my invention as illustrated, apparatus is provided comprising, as its basic component, a closed gas generating or carbureting tank I preferably of upright, cylindrical form with a suitable liquid level gauge 2 thereon and an inlet pipe 3 extending downwardly through the top thereof and discharging into a hollow spreader 4 in the bottom of said tank. The spreader 4 is of stepped, frusto-conical form to provide a series of annular stepped-down ledges 5 which are perforated, as at 6, so that air under pressure introduced into the spreader by way of the inlet pipe 3 will discharge upwardly through the apertures 6 in the form of multiple jets.

A pump 7, of any suitable type, is connected at the output side thereof to the gas generating, or carbureting, tank I by a liquid feed line 8 suitably coupled, as at 9, to said tank I adjacent the top of the tank. A back pressure check valve 10 is interposed in the liquid feed line 8.

An electric motor 11 is operatively coupled, as at 12, to the drive shaft 13 of the pump 7.

A liquid supply line 7' extends from the intake side of the pump 7 and is adapted to be connected to a source of liquid hydrocarbon supply, such as an underground storage tank, not shown, of a filling station.

A solenoid valve 14 is connected by a liquid discharge pipe 14' to the bottom of the gas generating, or carbureting, tank I with an outlet for discharging liquid from said tank. The solenoid valve 14 is designed to be connected to the storage tank, previously mentioned, for returning liquid from said tank I back to said storage tank.

An air pressure line 15 is provided for connection to a suitable source of air under pressure, for instance, an air compressor, not shown, of a filling station or the like. The air pressure line 15 extends to the top of the gas generating, or carbureting, tank I.

Interposed in the air pressure line 15, in the order named, between the source of air pressure and said tank I is a pressure gauge 16 for indicating the air pressure at the source, a pressure reducing valve 17 for reducing the pressure from the source, and a solenoid valve 18 for a purpose presently seen. A back pressure check valve 19 is also interposed in said line 15 between the solenoid valve 18 and said tank I.

A switch controlling pressure line 20 extends from the top portion of the gas generating, or carbureting, tank I to a branch line 21 suitably coupled at its ends to a pair of pressure-controlled electric switches 22, 23, the switch 22 being electrically connected, through a conduit 24, to the solenoid valve 14, and the switch 23 being similarly connected through the conduit 25 to the motor 11 to control said motor. A third pressure controlled electric switch 26 is electrically connected through a conduit 27 to the solenoid valve 18.

Extending from the top of the gas generating, or carbureting, tank 1 is a pressure line 28 to a pressure-control tank 29 having a pressure line 30 extending therefrom to the pressure-controlled electric switch 26. A back pressure check valve 31 is interposed in said line 28. A line 32 to a pressure gauge 33 is also interposed in said line 28 between said check valve 31 and said tank 1, and a line 34 to a pressure gauge 35 interposed in said line 28 between said check valve 31 and the pressure-control tank 29.

Three storage tanks 36, 37, 38 are provided in the apparatus for storing the mixture in quantity, three of like size and capacity as compared with the pressure-control tank 29 being utilized so that a standard size of small tanks may be embodied in the apparatus to reduce the cost thereof.

A discharge line 39 extends from the pressure-control tank 29 to the storage tank 36 with a second pressure-reducing valve 40 interposed therein. Discharge lines 41, 42 extend between the storage tanks 36, 37 and the storage tanks 37, 38 respectively. A line 39' is extended from the discharge line 39 to a pressure gauge 40' and between the pressure-reducing valve 40 and the storage tank 36, for a purpose presently seen.

A service discharge line 43 extends from the storage tank 38 with a shut-off cock 44 therein and a final pressure-reducing valve 45 therein between said cock 44 and the discharge end of the line.

The pressure-controlled electric switches 22, 23, 26 may be of any usual diaphragm type in which a movable element 46 closes circuit by engaging a pair of contacts 48 connected by lines 49, 50, in the conduits 51, 52, to a junction box 53, the movable element 46 in the case of the switches 22, 26 being connected upon opposite sides thereof to the solenoid coils 47 by lines 54, 55 in the conduits 24, 25 and the core 56 of each solenoid normally closing the valve. In the case of the pressure-controlled switch 23, the movable element 46 normally engages the related contacts 48 and is connected to opposite sides of the motor 11 by wires 57 to energize said motor when the contacts 46 are engaged. The junction box 53 is connected by lines 58, extending through a conduit 59, with a suitable switch 60 interposed in one line, to a suitable source of electric current, not shown.

The apparatus described is suitably mounted in a skeleton frame including a platform 65 supporting the generating, or carbureting tank 1, the pump 7, the electric motor 11, the solenoid valve 14 and the storage tanks 37 and 38, the pressure-control tank 29 and the storage tank 36 being supported in elevated position by elevated cross-bars 66, 67 in said frame and the pressure controlled electric switches 22, 23, 26, together with the junction box 53, being supported by another elevated crossbar 68 in said frame.

Describing now a cycle of operation of the apparatus. Assuming the apparatus to be completely empty of both liquid fuel and gas and is to be initially started, the switch 60 should be closed and the air pressure line 15 closed from the source of air supply, for instance at said source, or by a special valve, not shown, in said line. By closing the switch 60, the motor 11 will be energized to pump liquid fuel into the gas generating or carbureting tank 1 through the feed line 8. When sufficient liquid fuel, substantially a gallon, has been pumped into the gas generating or carbureting tank 1, as indicated by the liquid level gauge 2, the spreader 4 will be submerged and the air pressure line 15 should be opened to the source of air supply. There being no pressure in the tanks 29, 36, 37, 38 prior to such opening of said line 15, the electric switch 22 is open and solenoid valve 14 closed. Pressure switch 26 is closed and solenoid valve 18 open. Therefore, when the air pressure line 15 is opened to the source of air supply, which is done after the above designated quantity of liquid fuel has been pumped into said tank 1, air passes through the pressure reducing valve 17 and the pressure is reduced to substantially 25 pounds and then passes through solenoid valve 18 and into the generating, or carbureting, tank 1 to issue out of the spreader 4 and form with the liquid fuel a gaseous mixture in said tank 1. The pressure thus built up in said tank 1 passes into the pressure control tank 29 by way of the line 28 and when pressure in said tanks 1 and 29 has reached substantially twenty-four pounds, the electric switch 23 is opened, thus stopping the motor and pumping of liquid fuel into said tank 1. Pressure continues to rise in said tanks 1, 29 until it has been increased to substantially thirty-three pounds, at which point the electric switch 26 opens and de-energizes the solenoid valve 18 which closes, thus shutting off further air supply to said tank 1. At this point, the electric switch 22 closes thereby energizing solenoid valve 14 to open the same, whereupon the liquid fuel in said tank 1 is discharged back to the source of supply by the pressure of thirty-three pounds in said tank 1.

The gaseous mixture passes from the pressure-control tank 29 to the second pressure-reducing valve 40, by way of the line 39, and the pressure is reduced to, for instance, eight pounds, the mixture under such reduced pressure passing into the storage tank 36 and from there into the storage tanks 37, 38, successively, in a manner which will be obvious. This pressure may be verified by reading the pressure gauge 40'. From the storage tank 38, the mixture may be discharged and dispensed through the dispensing or service line 43, under control of the shut-off cock 44, through the final pressure-reducing valve 45 which is designed to reduce the pressure of the mixture to approximately five pounds for commercial use in internal combustion engines, particularly.

When the pressure in said tanks 1, 29 has been thus reduced to eight pounds, the electric switch 22 opens, causing the solenoid valve 14 to close and stop the discharge. At the same time, electric switch 23 closes, causing motor 11 to operate to pump liquid fuel into said tank 1. Should the use of gas be discontinued at this time, prior to pressure being reduced in the pressure control tank 1 to eight pounds, the motor 11 will continue to operate to pump liquid fuel into said tank 1 until two and one-half gallons have been pumped therein, which will raise the pressure therein to twenty-four pounds, causing electric switch 23 to open and stop further pumping.

The pressure reducing valves 17, 40 and 45 may be of any well known type and since the same form, per se, is no part of this invention, it has not been deemed necessary to illustrate and describe the same in detail.

It has been found, that with the liquid in the generating or carbureting tank 1, and the air passing through the liquid being under continuous pressure to 25 pounds, only the lightest and comparatively little of the volatile ends of the liquid is removed. Therefore, in returning the liquid to the source of supply, after carburetion, reduction in the amount of volatile ends, or free gases, in the source of supply is so gradual that the supply may be used for a considerable time for carbureting a substantially uniformly rich mixture before the supply has lost volatile substance to an extent at which the carbureted mixture would be too lean. Of course, at this point, a new source of supply should be tapped. In other words, the apparatus and method have been found to be highly efficient in operation with a given run of liquid from a source of supply which may be renewed, as the case may require.

As has been previously stated, the apparatus of this invention is particularly designed for installation at filling stations. When so installed, the apparatus is supplied with hydrocarbon liquid from one of the underground storage or supply tanks of the filling station which supplies a service pump or pumps for dispensing the liquid for sale to the public. Thus, when the apparatus is so installed, the residue liquid, after carburation, is returned to this source of supply to mix with the liquid therein for sale therewith. Inasmuch as such storage, or supply, tanks are frequently refilled to replace the liquid dispensed, and may be maintained filled to a given level and the liquid during carburation is depleted of only comparatively little and only the lighter and volatile ends, such return of the liquid, after carburation, to this source of supply will not deplete the liquid in the source of supply, to any appreciable extent of volatile gases.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

Having described the invention, what is claimed as new is:

1. Apparatus for forming a gaseous mixture of air and hydrocarbon liquid comprising a generating tank for receiving such liquid and air under pressure including a source of supply, means to supply such liquid under pressure to said tank, means to supply air under pressure to said tank to form with the liquid the gaseous mixture, a pressure-control tank communicating with the generating tank for receiving gas therefrom, means operative by rise of gas pressure in said pressure control tank to a predetermined degree for stopping the supply of liquid to the generating tank to limit the supply thereto, means operative to stop the supply of air to said generating tank when the gas pressure in said pressure-control tank rises above the predetermined pressure for stopping the supply of liquid to said generating tank, and means for discharging the liquid from said generating tank back to said source of supply concurrently with stopping of the supply of air thereto.

2. Apparatus for forming a gaseous mixture of air and hydrocarbon liquid comprising a generating tank for receiving such liquid and air under pressure, means to supply such liquid under pressure to said tank, means to supply air under prssure to said tank to form with the liquid the gaseous mixture, a pressure-control tank communicating with the generating tank for receiving gas therefrom, means operative by rise of gas pressure in said generating tank to a predetermined degree for stopping the supply of liquid to the generating tank to limit the supply thereto, means including an electro-magnetically operated valve operative to stop the supply of air to said generating tank and a pressure switch operated when the gas pressure in said pressure control tank rises above the predetermined pressure to control the first named valve for stopping the supply of air to the generating tank.

3. Apparatus for forming a gaseous mixture of air and hydrocarbon liquid comprising a generating tank for receiving such liquid and air under pressure, means to supply such liquid under pressure to said tank including a motor operated pump, means for supplying air under pressure to said tank to form with the liquid the gaseous mixture including an air pressure line having a control valve therein, a pressure-control tank communicating with the generating tank for receiving gas therefrom, means operative by rise of gas pressure in said generating tank to a predetermined degree for stopping said motor to limit the supply of liquid to said generating tank, and pressure operated means to close said valve and stop the supply of air to the generating tank when the gas pressure in the pressure-control tank rises above the predetermined degree for stopping the motor.

4. Apparatus for forming a gaseous mixture of air and hydrocarbon liquid comprising a generating tank for receiving such liquid and air under pressure, means to supply such liquid under pressure to said tank including a motor operated pump and a source of supply, means for supplying air under pressure to said tank to form with the liquid the gaseous mixture including an air pressure line having a control valve therein, a pressure-control tank communicating with the generating tank for receiving gas therefrom, means operative by rise of gas pressure in said pressure-control tank to a predetermined degree for stopping said motor to limit the supply of liquid to said generating tank, means to close said valve and stop the supply of air to the generating tank when the gas pressure in the pressure control tank rises above the predetermined degree for stopping the motor, and means for discharging the liquid from said generating tank back to said source of supply concurrently with closing of said valve.

LORRON L. WARRINER.

REFERENCES CITED

The following references are of record in the file of this patent:

UNITED STATES PATENTS

| Number | Name | Date |
| --- | --- | --- |
| 1,832,025 | Heyne | Nov. 17, 1931 |
| 1,894,607 | Carr | Jan. 17, 1933 |
| 1,964,315 | Cordes | June 26, 1934 |
| 2,050,567 | Griffin | Aug. 11, 1936 |
| 2,152,978 | Schisler | Apr. 4, 1939 |
| 2,207,689 | Baker | July 9, 1940 |
| 2,408,439 | Muchlhafer | Oct. 1, 1946 |

FOREIGN PATENTS

| Number | Country | Date |
| --- | --- | --- |
| 251,798 | Great Britain | May 13, 1926 |